Dec. 1, 1953
R. S. HOISINGTON
2,660,889
FIBER TESTER
Filed Jan. 2, 1952
5 Sheets-Sheet 1
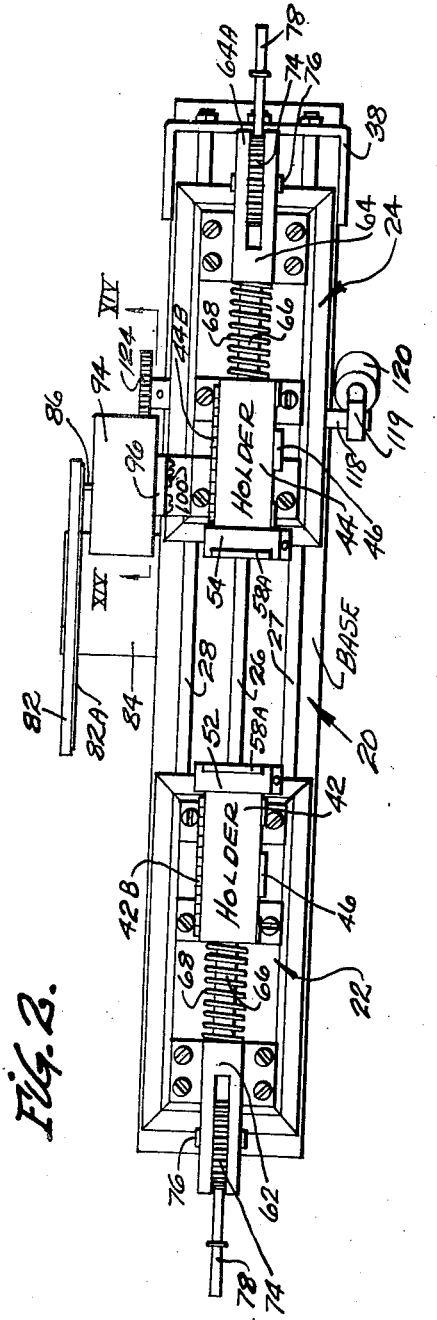
INVENTOR
RALPH S. HOISINGTON

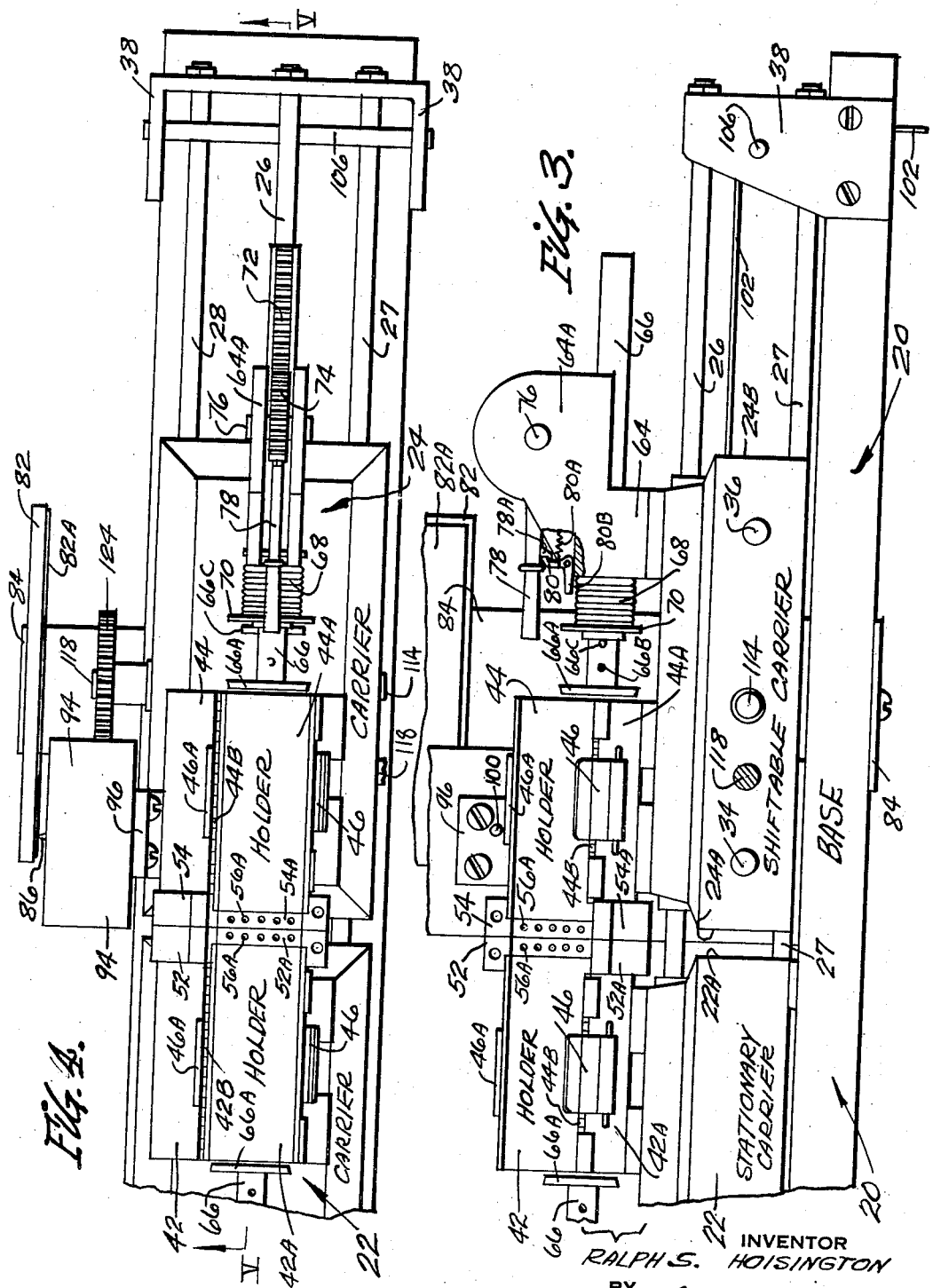

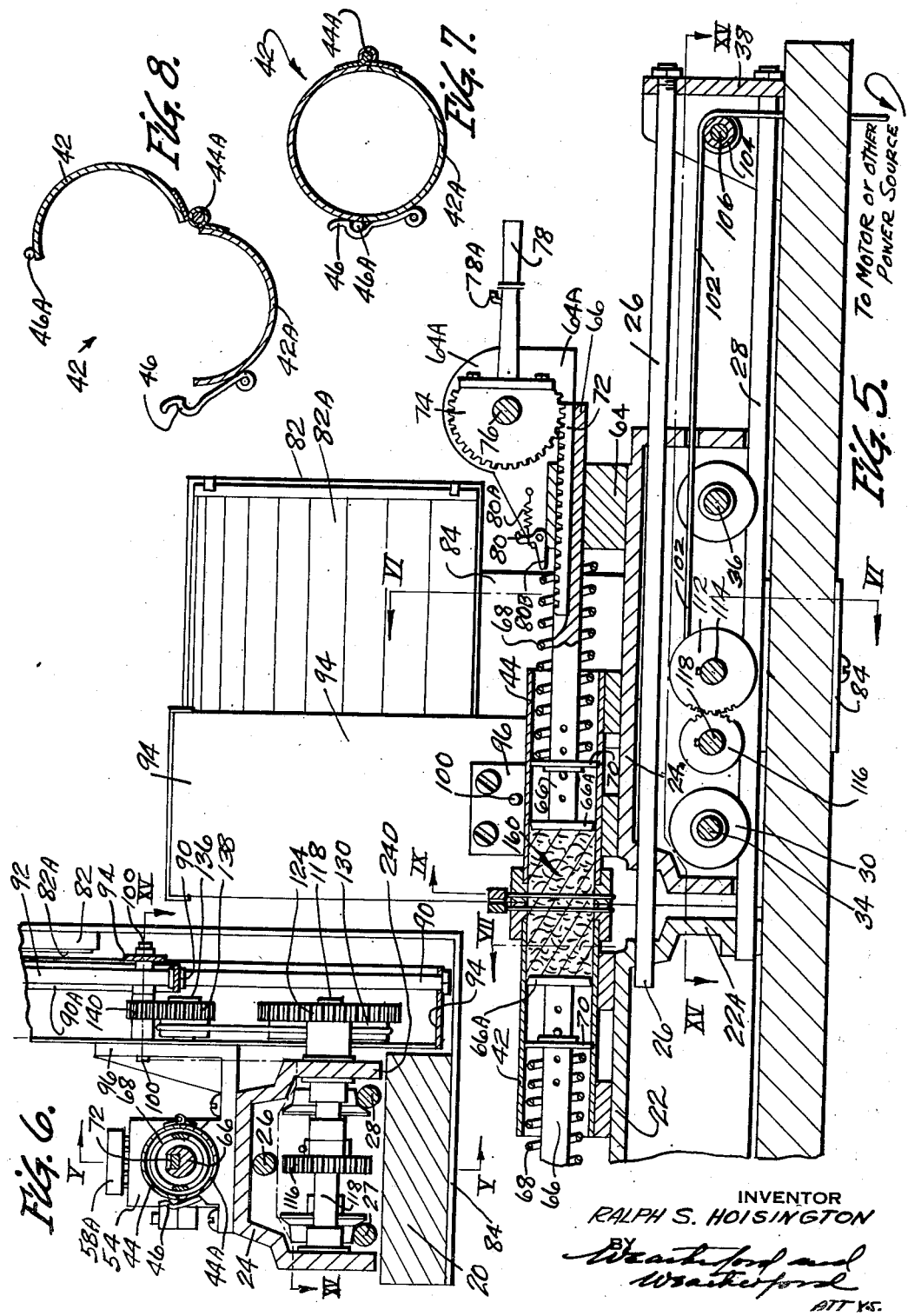

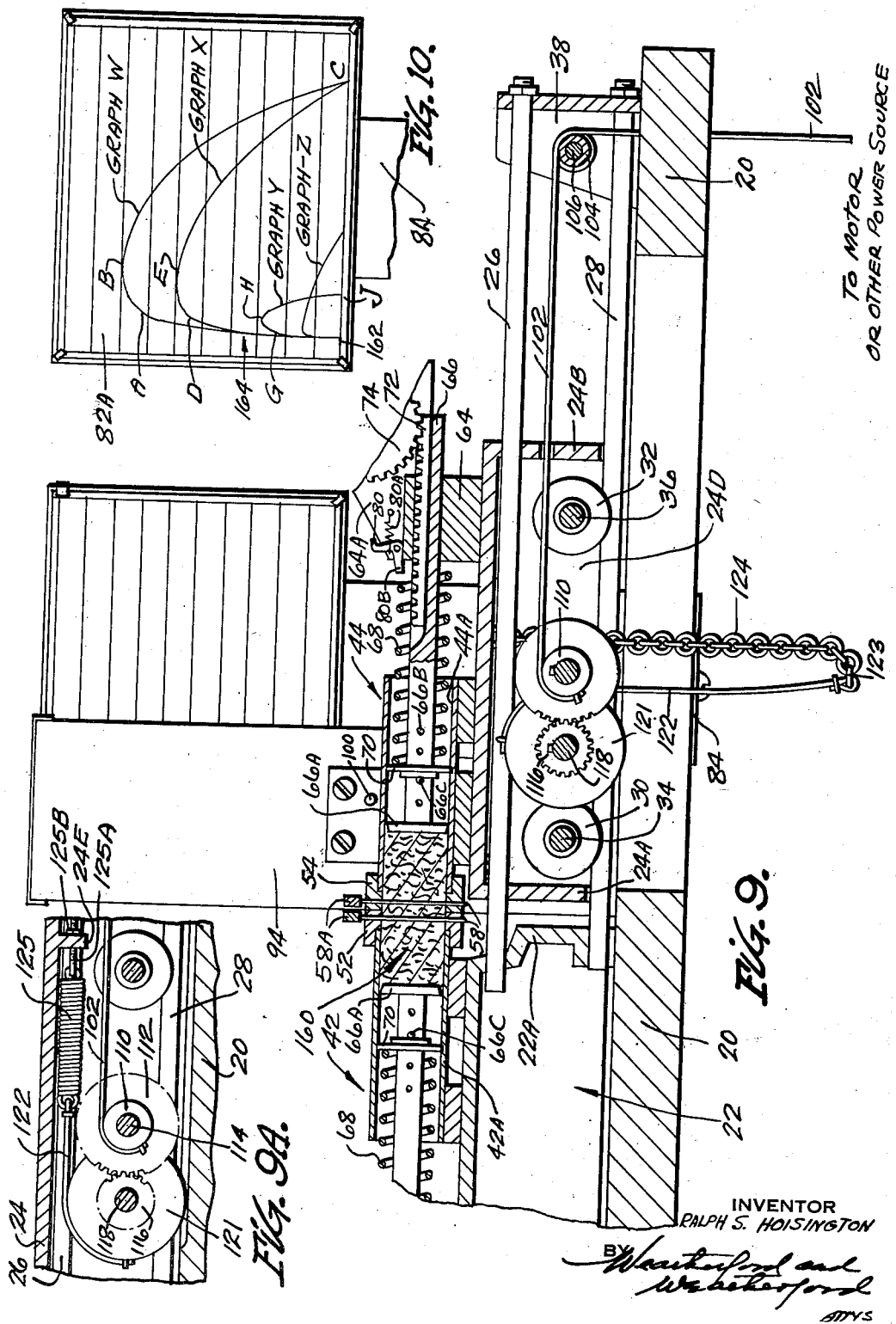

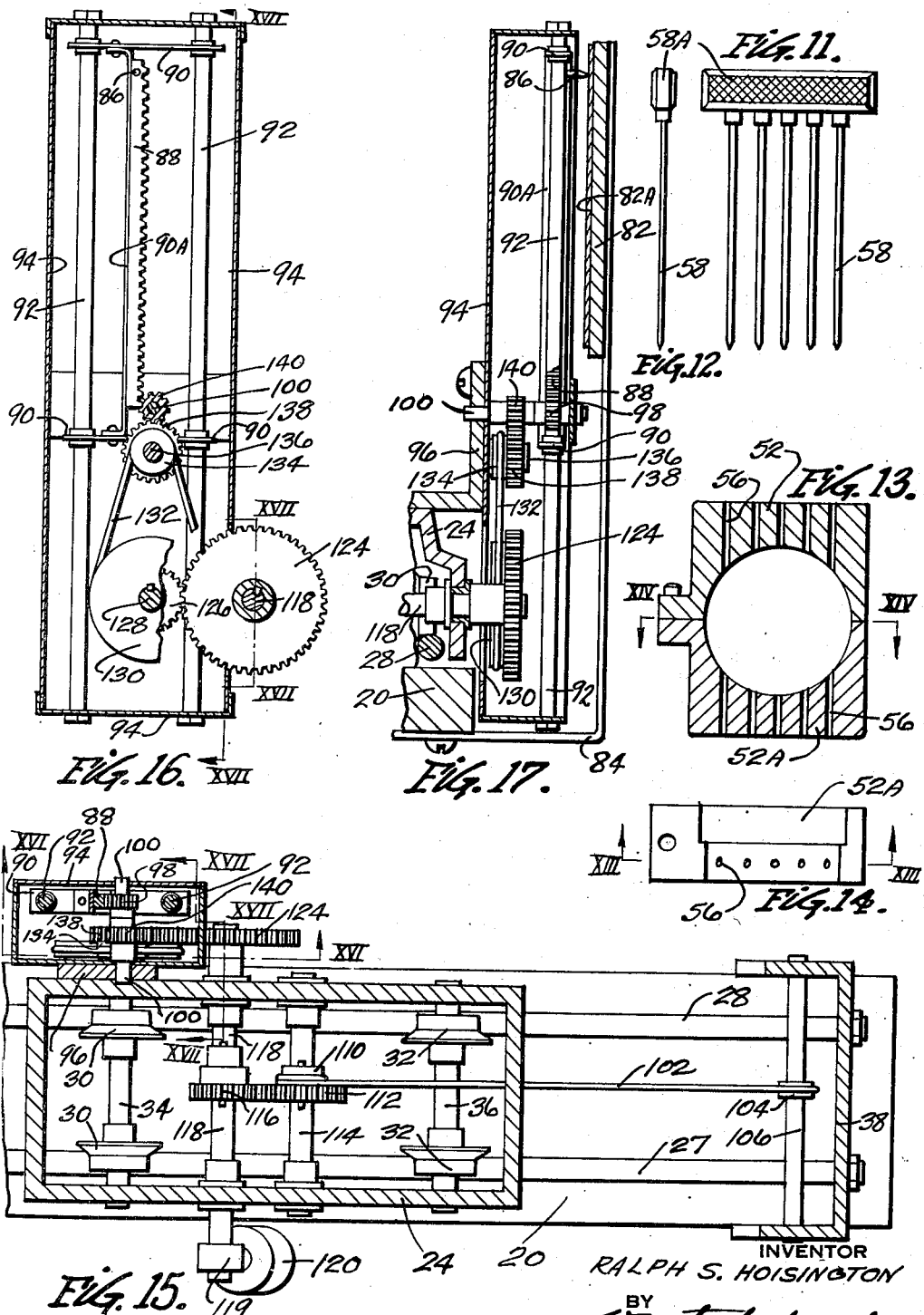

Patented Dec. 1, 1953

2,660,889

UNITED STATES PATENT OFFICE 2,660,889

FIBER TESTER

Ralph S. Hoisington, Memphis, Tenn.

Application January 2, 1952, Serial No. 264,449

13 Claims. (Cl. 73—159)

This invention relates to machines for determining the length and the length uniformity of fibres and their degrees of surface friction, and has particular reference to a machine for testing cotton fibres though it may be used for similarly testing other fibers.

In the field cotton is in bolls consisting of locks, each containing several seeds and a mass of fibers wrapped and interlocked around the seed, there being in each boll of cotton, hundreds of thousands of extremely fine ribbon like fibers of varied lengths spirally twisted from end to end and adapted to interengage and interlock when they are later straightened out and twisted into threads.

After picking, ginning and baling, and also after compressing and even recompressing to high density, samples are removed from the bales and tests made usually by both seller and purchaser of test portions taken from these samples, the tests being ordinarily made by shaping the sample into an elongated round mass of the nature of one inch to one and one half inches in diameter gripping the sample in the tester's hands with the thumbs and forefingers of the hands pulling and breaking the sample in two about the two thumbs as a fulcrum and observing carefully the breaking pull required, the appearance of the break and the apparent length of the fibers exposed. A relatively very small sample of the fibers is drawn from the broken end of one of the separate sample parts, and the fibers of the small sample loosely grasped near opposite ends of the sample between the thumbs and forefingers of the testers hands and gently pulled apart without breaking the fibers, and these parts are stacked and the operation repeated until a sample of more or less uniform length is obtained and being conventionally reported in terms of fiber length in the absence of any more definite term though the complete test actually determines the interlocking resistance of the fibers to longitudinal slippage and the persistence in this resistance as the sample is elongated and these indications as well as direct inspection of the length of fiber influence the length reported.

Obviously such tests are dependent not only on the condition of the samples as to wetness or dryness, and size, but also on the individuality and training of the tester and are subject to the fallibilities of human nature and often as well to the vagaries of atmospheric conditions.

The objects of the present invention are:

To provide mechanical testing means which will make every test in the same manner and provide data through which true comparison may be made.

To provide means through which under identical conditions as to size of sample, moisture content, fiber density, and temperature, tests may be mechanically made which are free from the fallibility of human operation and the vagaries of other conditions.

To provide means through which samples may be tested and the data obtained by such test recorded on a suitable chart on which indications of fiber length, interlocking resistance to slippages and integration of overall values other than color may be obtained.

To provide means to determine the length, length uniformity and frictional resistance of the fibers to longitudinal stresses.

The means by which the foregoing and other objects are accomplished and the manner of their accomplishment will readily be understood from the following specification on reference to the accompanying drawings in which:

Fig. 1 is a side elevational view of the machine with the carriers and their sample holders longitudinally separated;

Fig. 2 is a corresponding plan view;

Fig. 3 is a larger scale side elevational view with the carriers in approached relation and the holders abutting and open to receive a sample, part only of one carrier and holder being shown.

Fig. 4 is a corresponding plan view;

Fig. 5 is a sectional elevational view as on the line V—V of Figs. 4 and 6 with the holders closed and sample compressed; and with a chart calibrated in accordance with an arm carried weight.

Fig. 6 is a transverse sectional view on the line VI—VI of Fig. 5;

Fig. 7 is a transverse sectional view of a holder taken on the line VII—VII of Fig. 5, Fig. 8 a similar view with the holder open, Fig. 9 is a sectional elevational view substantially corresponding to Fig. 5 but modified by the substitution of a vertically raised weight and weight raising drum and a correspondingly calibrated chart.

Fig. 9A is a fragmentary view showing a spring substituted for the weight of Fig. 9, Fig. 10 is a chart card with typical test graphs shown thereon, Fig. 11 is a face view of a comb-like group of needles or needle comb taken on the line XI of Fig. 1 or 5.

Fig. 12 is a corresponding edge view of the needle comb.

Fig. 13 is a sectional view of one of the needle receiving or holding collars, taken on the line XI of Fig. 1 or 5 and the line XIII—XIII of Fig. 14.

Fig. 14 is a plan view taken on the line XIV—XIV of Fig. 13, showing the lower half of the needle collar.

Fig. 15 is a sectional plan view taken on the stepped line XV—XV of Fig. 6 and is part of the same lines of Fig. 5.

Fig. 16 is a sectional elevational view taken on the line XVI—XVI of Fig. 15.

Fig. 17 is a sectional elevational view on the stepped line XVII—XVII—XVII—XVII of Fig. 16.

Referring now to the drawings in which the parts are designated by numerals; 20 is a base on which a stationary carrier 22 and a shiftable carrier 24 are mounted. The shiftable carrier is apertured at its inner and outer ends, 24A, 24B, for rods 26, 27 and 28, is slidably mounted on the upper rod 26, and is provided with wheels 30 and 32 which run on the rods 27 and 28 and are respectively mounted on axles 34 and 36, which axles are journaled in the front and back side walls of the carrier 24. The rods 26, 27 and 28 are supported at their inner ends and may be secured to and thus supported by the inner end 22A of the stationary carrier 22. At their outer ends the rods are preferably supported by a bracket 38 secured to and extending upward from the base 20.

Mounted on the inner portions of the carrier 22 and 24 are holders for the samples to be tested, these holders comprising semi-cylindrical upper halves designated by the numbers 42 and 44 and complementary lower halves 42A, 44A, respectively adapted to complete cylindrical holders. The upper halves are hinged along their rear edges to the lower halves by hinges 42B, 44B, and along their front edges the lower halves carry latch portions 46, and the upper halves carry complementary latch portions 46A.

Secured to and forming the inner ends of the holders are cylindrically bored needle holders comprising upper halves 52, 54, and lower halves 52A, 54A respectively. The upper halves of the holder are provided with holes 56 (five shown) which are preferably equally spaced in plan and the lower halves with correspondingly spaced underlying holes 56A, these holes being adapted to receive banks of slim needles 58 of the nature of $\frac{1}{32}$" in diameter and preferably secured in the fashion of a comb to backs 58A, the needles having sharp points and being preferably of uniform size above the points.

Mounted on the outer ends of the carriers 22, 24 are heads 62, 64 which are horizontally bored at the level of and in longitudinal alinement with the axis of the holders 42, 42A and 44, 44A, to slidably receive plunger rods 66 which carry on their inner ends plungers 66A adapted to loosely fit in the bores of the holders 42, 42A, 44, 44A. Disposed around the plunger rods between the pistons and the inner faces of the heads 62 and 64 are compression springs 68 which urge the pistons toward the inner ends of their related holders. The springs may bear directly against the pistons, and holes 66B are preferably provided through the plunger rods, and annular discs 70 are slidably disposed around the rods so that pins 66C may be inserted in the holes to hold the discs and provide adjustment of the compression of the springs 68. The other portions of the rods are channelled to receive and have secured in the channels upwardly facing racks 72. The heads 62, 64 are vertically slotted to provide ear portions 62A, 64A between which are disposed pinions 74, turnably mounted on transversely disposed pivot pins 76 which are carried by the ears 62A, 64A as the case may be and which hold the pinions in mesh with the racks. The pinions have each a handle or handle portion 78 by means of which the pinions may be manually manipulated to retract the plunger rods 66 and heads 66A against the resistance of the springs 68, from an inwardly advance position within the holder 42, 42A, or 44, 44A as shown in Fig. 5, to a retracted position as in Figs. 3 and 4. The handles may be provided with latch portion 78A, adapted for engagement with complementary latch members 80 mounted on the head 62 or 64 as the case may be and urged into latching position by springs 80A. The latch members may be provided with portion 80B which may be manually depressed to disengage the latches.

It will here be repeated that the carrier 22, holder 42, 42A and related parts are fixedly mounted on the base 20, and that the carrier 24, holder 44, 44A and related parts are shiftably mounted on the base for movement toward and away from the carrier 22, holder 42, 42A and related parts.

To visually depict and provide records of the tests, a vertical chart support 82 is disposed rearwardly of the machine and supported preferably from the base 20 as by a bracket 84.

A removable chart 82A is placed and held against the face of the support in manner not indicated. The chart support and chart being fixedly mounted on the base 20 on which also the carrier 22 and holder 42, 42A are also mounted.

Record is made on the chart by a stylus 86. The stylus projects rearwardly against the chart from a vertically disposed and shiftable rack 88 which is preferably carried by a frame which may comprise upper and lower cross heads 90 and an intermediate member 90A rigidly coupled to the heads, the frame being slidably guided as by vertically disposed guide posts 92 which preferably are carried by a suitable housing 94. The housing in turn is connected through a bracket 96 to the shiftable carrier 24 and imparts to the stylus a horizontal movement across the chart.

Vertical movement of the rack and stylus may be accomplished by a pinion 98, carried by a shaft 100 journalled in the housing 24, and driven by a gearing later hereinafter described. The shiftable carrier 24 and holder 44, 44A may be moved away from the carrier 22 and holder 42, 42A and the housing 94 and stylus 86 moved across the chart by a traction cable 102, tension on the cable being applied at a uniform rate of speed by a power source (not shown), but which may be an electric motor through suitable reduction gearing (also not shown).

The cable may lead from the power source over an idler pulley 104 journalled on a cross shaft 106, and horizontally to and around and be secured at its end to a drum 110, which may be the hub of a spur gear 112, the gear and drum being secured as by keying on cross shaft 114, the shaft being journalled in the side walls of the carrier 24. The gear 112 meshes with a second and smaller gear 116 which is secured as by keying on a shaft 118, also journalled in the side walls of the carrier and extending through one of the walls.

Secured on the outer end of the shaft 118 is an arm 119 which carries on its free end a weight 120, the arm and weight being so disposed as to hang vertically below the supporting shaft when no stress is on the fibers, and the gear ratio being such as to swing the weight arm from such depending position to substantially a horizontal position when stress is put on the carrier 24 and its holder 44, 44A to shift them away from the carrier 22 and its holder 42, 42A, the weight increasingly resisting the stresses due to separating movement until the initial resistance of the sample in the holder is broken down at which time sample resistance so breaks down that the weight may swing downward to the initial position below the shaft and rewind the cable on the drum 110, unimportantly increasing the speed of movement of the carrier 24 and holder 44, 44A over the uniform rate of movement of the cable 102.

The effective resistance of the arm carried weight increases in accordance with the sines of the angular deflection of the arm from the vertical and requires for record in accordance with this invention a chart vertically and horizontally calibrated in accordance as the chart of Figs. 1 and 5 in which the horizontal lines are spaced in inverted sine relation and decreasing spacing from bottom to top whereas the addition of equal increments of weight permit the use of a chart calibrated vertically and horizontally at equally spaced intervals as the charts of Figs. 9 and 10.

Alternatively as shown in Fig. 9 instead of the arm 119 and weight 120, the shaft 118 may carry a drum 121 to which a cable 122 is secured, the cable depending and being secured to the bottom link 123 of a chain 124 of heavy links. This chain is hung as from the underside of the top of the carrier 24, so that it hangs down alongside the cable 122 and as the cable winds on the drum, the weight of successive chain links beginning with the bottom link 123, are transferred to the cable, adding successive equal increments of weight to the load being raised by the cable and to the torque of the drum induced by this cable pull and on breakdown of sample resistance, setting up in equal instead of variable succession, substantially the same reaction and rewinding action on the traction cable 102 as did the arm 119 and weight 120.

Fig. 9A shows a further alternative construction in which tension is put on the cable 122 by a spring 125 which may be anchored to a lug 24E depending from the underside of the top of the carrier 24. The end 125A of the spring may be threaded and passed through and adjustably secured to the lug 24 by a nut 125B.

The shaft 118 may extend through the rear wall of the carrier 24 and have keys or otherwise secured thereon a spur gear 124 which meshes with a much smaller gear 126 which it turns at correspondingly increased speed. The gear 126 may be mounted on and secured to a shaft 128 which carries and drives a belt pulley 130. The pulley 130 through a belt 132 drives a much smaller pulley 134 which is journalled on a stud shaft 136 carried by the housing 94, and is integral with, or secured in driving relation to, a gear 138 journalled on the same shaft. The gear 138 meshes with a pinion 140 which is secured as by keying on shaft 100 journalled in the housing. Mounted on and secured to the shaft 100 is a second pinion 98 which meshes with the rack 88 and through the train of gearing described raises the rack and stylus 86 responsive to rotative movement of the gear 112 under pull of the cable 102.

A latch 150 may be mounted on the carrier 22 and a complementary latch pin 152 on the carrier 24 by means of which the two carriers are latched together with the holders 42, 42A and 44, 44A are in abutting relation and compression of the sample in the holders is being effected by actions of the springs 68. The latch is preferably released by a solenoid magnet 154 which may be energized through a power circuit 156 which is closed concurrently with energization of the motor (not shown) through which pull on the carrier 24 is exerted.

In operation of the tester:

As a condition precedent to testing, a sample of cotton, larger than the sample to be tested, is conditioned for approximately four hours at a temperature of seventy degrees Fahrenheit and sixty-five percent relative humidity in an air conditioned room.

After this conditioning, a test sample 160 of predetermined weight is weighed out on an accurate balance.

The test sample is placed in a machine (not shown) known as a blender, comprising a series of wire surface cylinders, which round up the sample, uniformly distribute the fibers and establish a uniform degree of entanglement and make the sample ready for test.

The shiftable carrier 24 is moved to bring the inner end of the holder 44, 44A against the inner end of the stationary holder 42, 42A and the latch 150 is engaged with the pin 152 to hold the carriers 22 and 24 against relative displacement and the banks of needles 58 are removed from both holders. The handles 78 are turned inward, retracting the plungers 66A against the pressure of the springs 68 and compressing the springs and the latches 80 are engaged with the handle latch parts 78A to hold the handles down and the plungers retracted. The sample holder latches 46 are disengaged, the tops 42, 44 of the holders are raised, the sample 160 which has been made ready in the blender for test, is placed in the bottom halves 42A, 44A of the holders and the tops closed and latched.

The latches 80 are disengaged and the springs 68 allowed to take over and force the plungers 66A against the opposite ends of the sample in the holders longitudinally shortening and compressing the sample to the desired density.

The banks or combs of needles 58 of which there are two are pushed downward through the holes 56 in the top halves 42 and 44 of the holders and through the longitudinally compressed sample 160, Figs. 5 and 9, and into the holes 56A in the bottom halves 42A, 44A of the holder substantially anchoring the sample in adjacent planes in the two holders and the sample is ready for test.

At the beginning of the test a chart 82A is secured against the front face of the chart holder. There being no raising pull on the weight 120 or its alternate form the drum and chain assembly 121—122, no raising force on the stylus 86 at this time exists and the stylus is adjacent the bottom of the chart 82A.

To start the test, the carrier latches 150 are released, the carrier 24 and holder 44, 44A moving slightly away from the stationary carrier 22 and holder 42, 42A, and the stylus carrier 94 and stylus 86, a like amount with reference to the chart holder 82 and chart 82A, the stylus making a very short horizontal mark or indication 162 on the chart. On release of the latches the motor or other power source (not shown) is energized and a steady pull at a slow uniform rate set up on the cable 102 and through this cable on the drum like hub, or drum, 110 of the gear 112. The carrier 24 at this time is substantially immobilized by resistance of the sample 160 in the holders 42, 42A and 44, 44A to separating movement of the holder 44, 44A and the pull on the tractor cable 102 expends itself, almost if not entirely in rotating the drum 110 by unwinding movement of the cable through the gear 112, meshing gear 116, shaft 118 and gear 124, drives the gear 126, shaft 128 and pulley 130 and through the belt 132 pulley 134, shaft 136, gear 138, pinion 140, shaft 100 and pinion 98 raises the rack with which the latter pinion meshes and the stylus 86 carried by the rack scribes an upright line 164 on the chart 82A.

Turning movement of the shaft 118 above described turns the drum 121 carried by the shaft or alternatively swings the arm 119, the turning being increasingly resisted by the incrementally increasing weight of the chain links 124 (Fig. 9) as they are picked up by the cable 122 as it is wound on the drum 121, or alternatively as the weight 120 is raised by the arm movement, and upward movement of the stylus continues until the increasing resistance of the weight 120, or 124 as the case may be, balances and overcomes the frictional resistance of the sample 160 in the holders 42, 42A and 44, 44A to fiber separation and the point where such separation of the fibers of the sample is reached, slippage of fibers being effected, it being here noted that the effective weight action on the shaft 118 is increased by the radius of the drum 121, or the length of the arm 119, and again increased by the gears 116, 112 and the small size of the drum 110, so that the pull of the cable 102, and pull on the sample is multiplied many times over the weight used.

The total movement of the cable 102 up to this point even with tenacious long staple cotton samples hardly ever exceeds ⅜″ (three eighths) of an inch and with short staple cotton, or inferior cotton is much less.

The movement above described and the resistance set up by the incrementally increasing weight of the chain 122 are duplicated in the form of the device shown in Fig. 9A in which the spring 125 increasingly resists the wind up of the cable 122.

When the fiber separation point of the sample is reached and resistance becomes less the weight 120 or 124 drops unwinding the weight lift cable 122 from the drum 121 and through the gears 116 and 112 rewinds the traction cable 102 accelerating the carrier movement during the descent of the weight, slowly or abruptly in accordance with the tenacity of the sample as distinguished from its breaking point and through the gearing heretofore described as raising the stylus 86, lowers the stylus, scribing on the chart 82A, moving with the carrier 24 and holder 44 a downwardly extending curve across the chart, curves typically illustrate the graphs thus drawn and are shown on the chart of Fig. 10 as follows:

If the sample be a long staple one of high fiber bonding strength a graph similar to graph W will result. In this graph the initial upright line 164 of the graph extends as to a height A then curves somewhat abruptly over and upward to a maximum height B, and thereafter drops with increasing abruptness to the base line at C. A graph X is illustrative of a sample of equal fiber length and of less bonding strength. In this graph the beginning of rupture is shown at D, maximum at E and overall persistence at substantially the same point as the graph W.

Graph Y is illustrative of a very short staple high bonding strength sample the initial break being at G, maximum at H and end point at J.

Graph Z is illustrative of test of a longer staple very low bonding strength sample. Where the incrementally added weights of Fig. 9 are used the area of the graph may be measured by a planimeter.

Interpretation of a graph on the chart depends on the vertical height which is directly indicative of the frictional resistance of the staple of the sample tested, the horizontal width of the graph indicative of the length of the staple and bonding factor, and area of the graph of the over all properties of the sample.

The charts are preferably coordinated with manual methods now used by comparing graphs of a number of differing samples with the average of a large number of manual tests of each of the samples graphed and from such comparisons indicia markings derived, which may be imprinted on cards to be used to receive graphs of subsequently tested samples, such markings not being shown. As an instance of this, the graphs W, X, Y and Z shown on the card 82A of Fig. 10 and preferably a large additional number of graphs may be each so compared with the average of a large number of manual tests made of each of the same samples and from these, indicia (not shown) may be marked on the card and reproduced on cards for subsequent use.

It will be understood that the drawings and descriptions thereof hereinbefore set out are illustrative only and are not to be considered as limiting, except in claims where they are specifically set out.

I claim:

1. A fiber tester including a tubular stationary holder and a shiftable tubular holder, movable into end abutting relation to receive an elongated sample of massed fibers for testing, means for latching said holders in said abutting relation, means for longitudinally and oppositely compressing the outer ends of a sample of fibers disposed in said holders equally inward toward the abutting ends of said holders, needle means resisting sample displacement insertable into and transversely across said holders and through said sample in immediate adjacency to the abutting end of each of said holders, and means for exerting pull on said shiftable holder away from said stationary holder against resistance of said fiber sample and means for indicating said resistance.

2. A fiber tester in accordance with claim 1 in which said holders each comprise an upwardly facing lower half and a complementary downwardly facing upper half and said upper halves are hinged along one side edge to said lower halves and are provided with oppositely disposed latching means.

3. A fiber tester in accordance with claim 1 in which the upper and lower halves of said holders have holes substantially equally spaced horizontally in a vertical plane adjacent the abutting ends of the holders and the lower halves of the holders have complementary equally spaced holes in the same plane and said needle means comprises two banks of needles each group including a back and needles conforming in number, size and spacing to the holes in the upper and lower halves of said holders.

4. A fiber tester including an elongated base, a stationary carrier secured to said base, and a stationary tubular holder secured to said carrier, a movable carrier longitudinally shiftable along said base and a movable tubular holder secured to said movable carrier and shiftable into end abutting relation with said stationary holder to, cooperatively with said stationary holder, receive an elongated test sample of loosely massed fibers for testing; plungers respectively at opposite ends of said holders, abutments, respectively carried by said stationary and movable carriers, compression springs respectively interposed between said holders and said abutments, urging said plungers longitudinally and oppositely inward against opposite ends of a sample in said holders and longitudinally compressing said sample, means respectively mounted on said carriers manually operable for retracting said plungers and releasable latching means for holding said retracting means during placing of said sample, means in immediate adjacency to the abutting end of each respectively of said holders for resisting displacement of said compressed sample with respect to said holder, means for exerting sample rupturing pull away from said stationary holder against resistance of said sample, said pull means including an interposed portion incrementally increasing to said rupturing pull and incrementally reversely decreasing subsequent to rupture, and means including cooperating parts coupled respectively to said stationary and said movable holders for indicating the increasing and decreasing amounts of said pull and the relative extension of said sample under said pull.

5. A fiber tester comprising an elongated base and parts carried thereby including a stationary tubular holder secured to said base and a movable tubular holder longitudinally shiftable along said base into end abutting relation with said stationary holder to cooperatively receive with said stationary holder an elongated test sample of loosely massed fibers for testing, compressing means respectively at opposite ends of said holders, means coupled to said stationary holder and means coupled to movable holders respectively, for moving said compressing means longitudinally and oppositely inward and longitudinally compressing said sample of fibers in said holders, means in immediate adjacency to the abutting ends of each respectively of said holders for resisting sample displacement with respect to its said holder, means for exerting sample rupturing pull on said movable holder away from said stationary holder against resistance of said sample, said pull means including an interposed portion incrementally increasing to said rupturing pull and thereafter incrementally decreasing as separation of the end portions of said sample is completed, and means including cooperating parts coupled respectively to said stationary and said movable holders for indicating the increasing amount of said pull to said rupture point and the decreasing amount of said pull therebeyond and the relative extension of said sample under said pull.

6. A fiber tester comprising an elongated base and parts carried thereby including a stationary holder secured to said base and a shiftable carrier mounted on and longitudinally shiftable along said base, a tubular holder mounted on said shiftable carrier and longitudinally shiftable therewith into end abutting relation with said stationary holder to cooperatively receive an elongated test sample of loosely massed fibers for testing, means respectively at opposite ends of said holders for longitudinally compressing said sample in said holders, means in immediate adjacency to the abutting end of each respectively of said holders for resisting sample displacement with respect to said holders, means for exerting on said movable carrier and holder sample rupturing pull away from said stationary holder against resistance of said sample, and means including cooperating parts coupled respectively to said stationary and said movable holders for indicating the increasing amount of said pull up to rupture, and decreasing amounts of said pull thereafter, and the relative extension of said sample under said pull, said pull means including first drum journalled by said movable carrier, a pull cable around and secured to said drum, means for exerting a sample rupturing pull on said cable; a second drum spaced from said first drum and journalled in said carrier, interposed gearing driving said second drum, a resistance cable around and secured to said second drum in opposed pull relation to said pull cable, and means secured to said resistance cable adapted to exert incrementally increasing resistance to turning of said drums.

7. A fiber tester in accordance with claim 6 in which said second drum is secured on a transversely disposed shaft journalled in said shiftable carrier and extending through and beyond the back wall of said carrier, a chart holder is mounted on said base, a stylus holder is mounted on and longitudinally movable with said movable carrier, said holder carries a vertically shiftable stylus, said stylus projects into scribing engagement with a chart on said holder, and gearing adapted to raise and lower said stylus is carried by said holder and driven by said second drum shaft.

8. A fiber tester comprising a base and parts carried thereby including a stationary tubular holder, a carrier shiftably mounted on said base for movement toward and away from said holder and a shiftable tubular holder mounted on said carrier in longitudinal alignment with said stationary holder and movable into abutting relation therewith to receive an elongated sample of loosely massed fibers for testing; plunger means alined with and respectively at opposite ends of said holders and means for moving said plungers inward from the outer ends of said holders for compressing a mass of fibers disposed in said holders, means insertable transversely to said holders and through said compressed sample in immediate adjacency to the abutting end of each respectively of said holders for locally resisting sample displacement relatively to said holders, means for exerting through said shiftable carrier, pull on said shiftable holder away from said stationary holder against resistance of said fiber sample, means for indicating said resistance, said pull exerting means including a first drum journalled by said carrier, a cable around and secured to said drum and means for exerting an unwinding pull on said cable, a shaft spaced from said drum, and journalled in said carrier, a second drum secured on said shaft, a second cable around and secured to said second drum and gearing interposed between said drums turning said second drum to wind said second cable thereon as said first cable unwinds from said first drum, means for exerting on said second cable progressively increasing resistance to winding until resistance of said sample is overcome, and separating movement of said second holder and said carrier occurs; said indicating means including a chart carried by said base, movable with said carrier across said chart vertically disposed guide means mounted in said housing, a stylus carrier including a vertical rack slidably mounted on said guide a stylus carried by said stylus carrier and projecting into chart engagement, a pinion shaft journalled in said housing, a pinion secured on said shaft, and meshing with said rack, a gear secured on said carrier journalled shaft, and driving means interposed between said gear and said pinion shaft coordinated to turn said pinion and raise said stylus responsive to cable winding movement of said second drum and drum shaft, and to lower said stylus on unwinding movement of said drum.

9. A fiber tester comprising a base and parts carried thereby including a stationary tubular holder, a carrier shiftably mounted on said base for movement toward and away from said holder an a shiftable tubular holder mounted on said carrier and in longitudinal alinement with said stationary holder and movable into an abutting relation therewith to receive an elongated sample of loosely massed fibers for testing, means for longitudinally compressing said sample and locally anchoring said sample to the abutting ends of said holders, means for exerting through said shiftable carriers, pull on said shiftable holder away from said stationary holder against resistance of said fiber sample, and means for indicating said resistance to said pull exerting means including a first drum journalled by said carrier, a cable around and secured to said drum and means for exerting an unwinding test pull on said cable, a shaft spaced from said drum, and journalled in said carrier, a second drum secured on said shaft, a second cable around and secured to said second drum and gearing interposed between said drums turning said second drum to wind said cable thereon as first cable unwinds from said first drum means for exerting on said second cable progressively increasing resistance to winding until the resistance of said sample is overcome, and movement of said second holder and said carrier occurs, said indicating means including a chart carried by said base a vertically shiftable stylus and a stylus housing carried by and movable with said carrier across said chart and means for raising and lowering said stylus responsive to resistance of said sample, said means including vertically disposed guide means mounted in said housing, a stylus carrier including a vertical rack slidably mounted on said guide means a pinion shaft journalled in said housing, a pinion secured on said shaft and pinion driving means including a gear secured on said carrier journalled shaft, and driving means interposed between said gear and said pinion shaft coordinated to turn said pinion and raise said stylus responsive to cable winding movement of said second drum and said shaft, and lower said stylus on unwinding movement of said drum.

10. A fiber tester including a stationary holder and a shiftable holder, movable substantially into end abutting relation to receive an elongated sample of massed fibers for testing, means for oppositely compressing the ends of a sample of fibers disposed in said holders equally toward the adjacent ends of said holders, needle means resisting sample displacement insertable into said holders and through said sample in immediate adjacency to the said ends of each of said holders, and means for exerting pull on said shiftable holder away from said stationary holder against resistance of said fiber sample.

11. A fiber tester including a tubular stationary holder and a shiftable tubular holder, movable to shift one end of said shiftable holder substantially into abutting relation with one end of said stationary holder to position said holders to receive an elongated sample of massed fibers for testing, means for longitudinally and oppositely compressing the outer ends of a sample of fibers disposed in said holders equally inward toward the adjacent ends of said holders, needle means resisting sample displacement insertable into and transversely across said holders and through said sample in immediate adjacency to the said ends of each of said holders, means for exerting pull on said shiftable holder away from said stationary holder against resistance of said fiber sample, and means for indicating said resistance.

12. A fiber tester including a pair of holders, one of said holders being shiftable to and from a position in which adjacent ends of said holders are in substantial abutment and said holders are adapted to receive an elongated sample of massed fibers for testing, means for compressing the ends of a sample of fibers disposed in said holders when in said position equally toward said adjacent ends, needle means resisting sample displacement insertable into said holders and through said sample in immediate adjacency to said adjacent ends, and means for exerting pull on said shiftable holder away from said other holder against resistance of said fiber sample.

13. A fiber tester including a pair of holders, one of said holders being shiftable to and from a position in which adjacent ends of said holders are in substantial abutment and said holders are adapted to receive an elongated sample of massed fibers for testing, means for latching said holders in said position, means for compressing the ends of a sample of fibers disposed in said holders when in said pisition equally toward said adjacent ends, needle means resisting sample displacement insertable into said holders and through said sample in immediate adjacency to said adjacent ends, and means for exerting pull on said shiftable holder away from said other holder against resistance of said fiber sample.

RALPH S. HOISINGTON.

References Cited in the file of this patent

UNITED STATES PATENTS

| Number | Name | Date |
|---|---|---|
| 1,429,899 | Mallory | Sept. 19, 1922 |
| 1,931,925 | Hopkins | Oct. 24, 1933 |
| 2,325,026 | Anway | July 27, 1943 |

FOREIGN PATENTS

| Number | Country | Date |
|---|---|---|
| 626,716 | Great Britain | Aug. 22, 1946 |